United States Patent
Sugahara et al.

(10) Patent No.: US 10,227,176 B2
(45) Date of Patent: Mar. 12, 2019

(54) PICKING APPARATUS

(71) Applicant: Kabushiki Kaisha Toshiba, Minato-ku (JP)

(72) Inventors: Atsushi Sugahara, Kawasaki (JP); Hideichi Nakamoto, Setagaya (JP); Junya Tanaka, Ota (JP); Akihito Ogawa, Fujisawa (JP); Takafumi Sonoura, Yokohama (JP); Haruna Eto, Arakawa (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 186 days.

(21) Appl. No.: 15/444,747

(22) Filed: Feb. 28, 2017

(65) Prior Publication Data

US 2018/0065806 A1    Mar. 8, 2018

(30) Foreign Application Priority Data

Sep. 5, 2016   (JP) .................................. 2016-173048

(51) Int. Cl.
| | |
|---|---|
| *B65G 1/04* | (2006.01) |
| *B65G 1/137* | (2006.01) |
| *B25J 5/00* | (2006.01) |
| *B25J 9/00* | (2006.01) |
| *B25J 9/02* | (2006.01) |

(Continued)

(52) U.S. Cl.
CPC ............ *B65G 1/0492* (2013.01); *B25J 5/007* (2013.01); *B25J 9/0096* (2013.01); *B25J 9/023* (2013.01); *B25J 9/04* (2013.01); *B25J 19/023* (2013.01); *B65G 1/137* (2013.01); *B65G 1/1373* (2013.01); *B65G 1/1375* (2013.01)

(58) Field of Classification Search
USPC ........................................................ 700/218
See application file for complete search history.

(56) References Cited

U.S. PATENT DOCUMENTS

| | | | |
|---|---|---|---|
| 5,119,732 A * | 6/1992 | Lisy ........................ | E01B 23/00 104/102 |
| 10,052,758 B2 * | 8/2018 | Kogan ..................... | B25J 9/162 |

(Continued)

FOREIGN PATENT DOCUMENTS

| | | |
|---|---|---|
| JP | 62-244807 | 10/1987 |
| JP | 6-144507 | 5/1994 |

(Continued)

*Primary Examiner* — Kyle O Logan
(74) *Attorney, Agent, or Firm* — Oblon, McClelland, Maier & Neustadt, L.L.P.

(57) ABSTRACT

According to one embodiment, a picking apparatus includes a carriage, a holding mechanism, and a movement mechanism. The holding mechanism includes an arm, a rotating shaft provided at one end of the arm and rotating the arm, and a holding part provided at the other end of the arm and able to hold at least one object. The movement mechanism is provided on the carriage, and includes a first movement part that moves the rotating shaft along a first direction toward the object, and a second movement part that moves the first movement part along a second direction intersecting with the first direction and approximately perpendicular to the carriage. The first movement part is positioned along a direction away from the object with respect to the second movement part.

20 Claims, 7 Drawing Sheets

(51) Int. Cl.
*B25J 9/04* (2006.01)
*B25J 19/02* (2006.01)

(56) References Cited

U.S. PATENT DOCUMENTS

| | | | | |
|---|---|---|---|---|
| 2001/0052708 | A1* | 12/2001 | Schmalz | B65G 47/91 |
| | | | | 294/65 |
| 2013/0209203 | A1* | 8/2013 | Rafols | B65G 1/0407 |
| | | | | 414/279 |
| 2014/0341695 | A1* | 11/2014 | Girtman | B65G 59/02 |
| | | | | 414/797 |
| 2015/0073589 | A1* | 3/2015 | Khodl | B25J 5/007 |
| | | | | 700/218 |
| 2015/0332213 | A1 | 11/2015 | Galluzzo et al. | |
| 2015/0344225 | A1 | 12/2015 | Nakamura et al. | |
| 2016/0016311 | A1* | 1/2016 | Konolige | B25J 5/007 |
| | | | | 700/245 |
| 2016/0207195 | A1 | 7/2016 | Eto et al. | |

FOREIGN PATENT DOCUMENTS

| | | |
|---|---|---|
| JP | 8-231009 | 9/1996 |
| JP | 2008-120519 | 5/2008 |
| JP | 2009-202248 | 9/2009 |
| JP | 2015-224125 | 12/2015 |
| JP | 2016-132521 | 7/2016 |

\* cited by examiner

FIG. 5B (FRONT VIEW)

FIG. 6A

DETAIL VIEW OF CONVEYOR PART (TOP VIEW)

DETAIL VIEW OF CONVEYOR PART
(TOP VIEW)

DETAIL VIEW OF CONVEYOR PART
(TOP VIEW)

PICKING APPARATUS

CROSS-REFERENCE TO RELATED APPLICATION

This application is based upon and claims the benefit of priority from Japanese Patent Application No. 2016-173048, filed on Sep. 5, 2016; the entire contents of which are incorporated herein by reference.

FIELD

Embodiments described herein relate generally to a picking apparatus.

BACKGROUND

Currently, in a distribution center, in order to sort large corrugated boxes, automatic sorting by a sorter is performed. Furthermore, as to boxes flown on a belt-conveyor, irrespective of a size of an object (a piece of package), recognition of the object and automation of holding thereof are progressed.

On the other hand, as to sorting, packing, binning and picking of commodity packages, they are performed manually yet. While a person is pushing a picking cart and picking the commodity packages, the person's working to inspect them by a bar-code reader is repeated.

In case of a wide warehouse, many workers are necessary, and manpower shortage is concerned. Accordingly, automation of these workings by a robot is desired. In a store shelf or a corrugated box, commodity packages are stacked with being little-broken, and control of position and posture of a holding part to stably pick them is difficult. Furthermore, in case of picking an object except for objects of picking target, processing for the object is difficult. As a result, automation of these working by the robot is hard.

DETAILED DESCRIPTION

According to one embodiment, a picking apparatus includes a carriage, a holding mechanism, and a movement mechanism. The holding mechanism includes an arm, a rotating shaft provided at one end of the arm and rotating the arm, and a holding part provided at the other end of the arm and able to hold at least one object. The movement mechanism is provided on the carriage, and includes a first movement part that moves the rotating shaft along a first direction toward the object, and a second movement part that moves the first movement part along a second direction intersecting with the first direction and approximately perpendicular to the carriage. The first movement part is positioned along a direction away from the object with respect to the second movement part.

Hereinafter, the picking apparatus of various embodiments will be described with reference to the accompanying drawings. Parts having same sign are the same part respectively. Moreover, the drawings are schematic or conceptual ones. In the drawings, a relationship between a thickness and a width of each part, and a relative dimension of a size between each part, are not always equal to actual ones. Furthermore, even if the drawings show the same part, in some cases, mutual measurements and relative dimensions of the same part are shown differently by the respective drawings.

(The first embodiment)

Figure 1A:
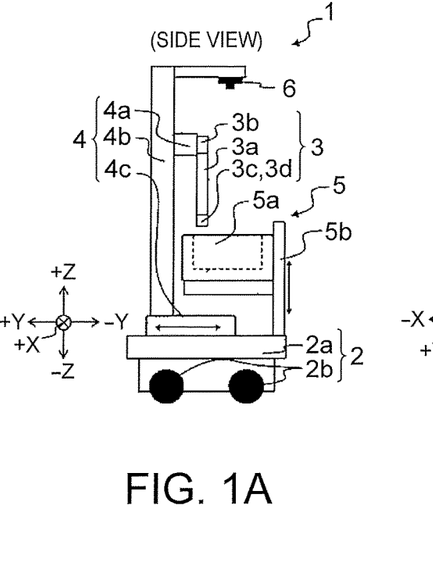
FIGS. 1A and 1B are a side view and a front view of a picking apparatus according to the first embodiment.
Figure 1B:
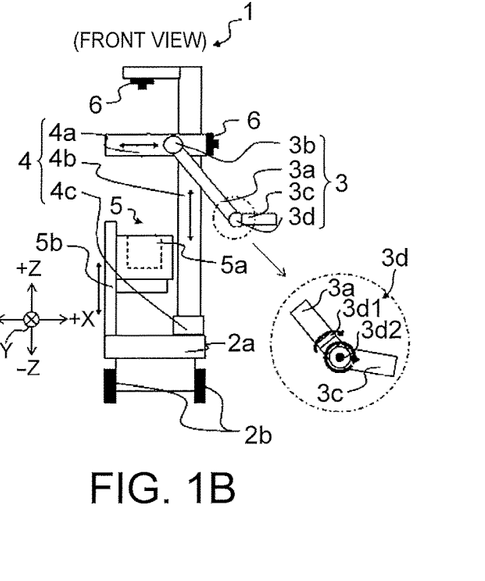
Figure 2:
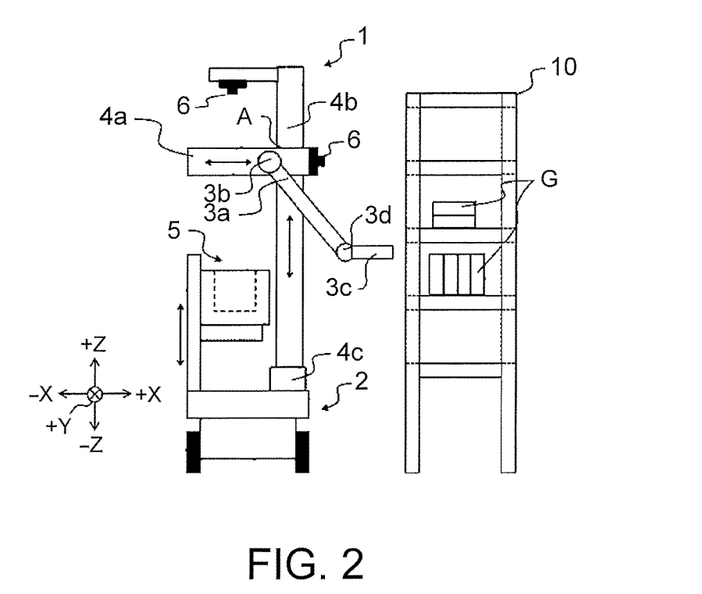
FIG. 2 is a schematic diagram of the picking apparatus which faces a shelf carrying objects.

A picking apparatus according to the first embodiment is explained by referring to FIGS. 1A, 1B and 2. FIGS. 1A and 1B are a side view and a front view of the picking apparatus 1 according to the first embodiment. FIG. 2 is a schematic diagram of the picking apparatus 1 which faces a shelf 10 carrying objects G.

Here, in order to simplify the explanation, (+X)-direction, (−X)-direction, (+Y)-direction, (−Y)-direction, (+Z)-direction and (−Z)-direction, are defined as follows. For example, (+X)-direction, (−X)-direction, (+Y)-direction and (−Y)-direction are respective directions approximately along a horizontal direction. (−X)-direction is a reverse direction of (+X)-direction. In the first embodiment, (−X)-direction is "a direction to pull the object G toward the picking apparatus 1". "The direction to pull the object G" is a direction from the shelf 10 to the picking apparatus 1 in FIG. 2. (+Y)-direction is a direction intersecting with (+X)-direction (e.g., a direction approximately perpendicular thereto). (−Y)-direction is a reverse direction of (+Y)-direction. (+Z)-direction is a direction intersecting with (+X)-direction and (+Y)-direction (e.g., a direction approximately perpendicular thereto), for example, approximately upward vertical direction. (−Z)-direction is a reverse direction of (+Z)-direction, for example, approximately downward vertical direction.

As shown in FIG. 2, for example, the picking apparatus 1 can move along (+Y)-direction or (−Y)-direction while facing the shelf 10 located on a floor, and picks the object G carried in the shelf 10. In order for the picking apparatus 10 to recognize the object G from the lateral direction ((+X)-direction, (−X)-direction, (+Y)-direction, (−Y)-direction) and to further pick the object G, for example, the shelf 10 includes a space at the side face. The object G includes a product packed in a corrugated box, a packaged product, a single product, and so on.

As shown in FIG. 1, the picking apparatus 1 includes a carriage 2, a holding mechanism 3 to hold the object G, a movement mechanism 4 to move the holding mechanism 3, and a cargo bed 5 to put the object held by the holding mechanism 3.

The carriage 2 includes a base 2a on which the holding mechanism 3, the movement mechanism 4 and the cargo bed 5 are mounted. For example, four wheels 2b are equipped with the base 2a. By rotating the wheel 2b, the carriage 2 moves on the floor on which the shelf 10 is located. The moving means is not limited to the wheel. It may be a caterpillar or moving on a rail previously located on the warehouse.

The carriage 2 is AGV (Automated Guided Vehicle) and includes a controller (not shown in FIGS. 1 and 2) to control driving of the wheel 2b. The controller includes a position sensor (such as GPS) or an image sensor, and measures its own position on a guideway by this sensor. The controller stores layout information of the shelf position and the guideway in the factory or the warehouse, and determines a target route from the layout information and its own position acquired by the sensor. When the layout of the shelf position or the guideway is changed, the layout information in the controller is changed. As to the above-mentioned carriage 2, a guideless system to detect its own position by GPS was explained. However, the carriage 2 is not limited to this guideless system. For example, a guideless system to detect the guideway by a guide wire or a magnetic tape located on a floor of the factory or the warehouse may be used.

The holding mechanism 3 includes an arm 3a, a rotating shaft 3b provided at one end of the arm 3a and rotating the arm 3a, a holding part 3c provided at the other end of the arm 3a and holding the object G, and a joint 3d between the arm 3a and the holding part 3c.

The arm 3a makes the holding part 3c approach (be nearer) the object G. For example, the arm 3a is formed from an aluminum alloy or a plastic material. Anything having lightness and high rigidity may be used. Furthermore, the arm 3a may have multi-joint structure.

The rotating shaft 3b is composed by a motor, a speed reducer and a bearing. The motor, the speed reducer and the bearing are located concentrically.

The holding part 3c holds the object G. The holding part 3c includes a plurality of suction pads (not shown in FIGS. 1 and 2) connected to a vacuum pump (not shown in FIGS. 1 and 2). By contacting the suction pad with the object G, and by reducing the pressure between the object G and the suction pad by the vacuum pump, the holding part 3c holds the object G with sucking. The holding part 3c is not limited to the method for sucking by the suction pad. A method for clamping by a plurality of hooks may be used. The vacuum pump may be located in the carriage 2.

The joint 3d includes a joint 3d1 and a joint 3d2. The joint 3d1 rotates the holding part 3c along a twisting direction having an axis of a longitudinal direction of the arm 3a. The joint 3d2 rotates the holding part 3c along a direction (axis) perpendicular to the longitudinal direction of the arm 3a. The joint 3d1 and the joint 3d2 equip with a servomotor respectively. The servomotor drives the holding part 3c toward a predetermined direction. As mentioned-above, the joint 3d includes two joints. However, the joint 3d is not limited to this case. For example, a ball joint may be used.

Next, the movement mechanism 4 is explained. The movement mechanism 4 includes a first movement part 4a, a second movement part 4b and a third movement part 4c. The movement mechanism 4 is a linear motion mechanism to move the holding mechanism 3 along three axes directions. Specifically, a rotating shaft 3b of the holding mechanism 3 is located at the first movement part 4a. The first movement part 4a moves the rotating shaft 3b along (+X)-direction or (−X)-direction. The X-direction is a direction to make the holding mechanism 3 approach (be nearer) the shelf or a direction to make the holding mechanism 3 keep away (be farer) from the shelf. The second movement part 4b is located on the base 2a of the carriage 2 perpendicularly, and connected to the first movement part 4a approximately perpendicularly. The second movement part 4b moves the first movement part 4a along (+Z)-direction or (−Z)-direction. The third movement part 4c is located on the base 2a and horizontal to a top face of the base 2a. The third movement part 4c is connected to the second movement part 4b approximately perpendicularly. From another viewpoint, the third movement part 4c is approximately perpendicular to the first movement part 4a. The third movement part 4c moves the second movement part 4b along (+Y)-direction or (−Y)-direction. Namely, the third movement part 4c moves the holding mechanism 3 along (+Y)-direction or (−Y)-direction. The Y-direction is a direction in parallel with the shelf when the picking apparatus 1 picks the object G.

The first movement part 4a, the second movement part 4b and the third movement part 4c are located in parallel with three axes direction (moving direction) respectively, and moving slidably along the respective axes directions.

As shown in FIG. 2, under the condition that the picking apparatus 1 faces the shelf 10 and the holding part 3c holds the object G, the second movement part 4b on the carriage 2 is positioned at the nearer side to the shelf 10. For example, the second movement part 4b is positioned at the nearer edge of the base to the shelf 10. On the other hand, the first movement part 4a is connected to the second movement part 4b approximately perpendicularly so as to be farer from the shelf 10. The first movement part 4a faces toward the inside direction of the carriage 2 with respect to the second movement part 4b. The third movement part 4c is positioned on the base 2a of the carriage 2 and connected to the second movement part 4b. Namely, on the carriage 2, the third movement part 4c is positioned at the nearer side to the shelf 10. Here, "facing" means that the second movement part 4b and the third movement part 4c (each located on the carriage 2) are positioned approximately in parallel with the side face of the shelf 10. Namely, the respective moving directions of the second movement part 4b and the third movement part 4c are approximately in parallel with the side face of the shelf 10.

As the movement mechanism 4, for example, a linear motion mechanism of an electric slider onto which a stepping motor is loaded may be used. Furthermore, instead of the electric slider, an electric cylinder may be used.

In the movement mechanism 4, a recognition device 6 is located. The recognition device 6 recognizes a distance from the movement mechanism 4 to the shelf 10 or the object located in the shelf 10, a shape and a carrying situation of the object G. The recognition device 6 is located at a tip of the first movement part 4a. Concretely speaking, as shown in a front view of FIG. 2, under the condition that the picking apparatus 1 faces the shelf 10, the recognition device 6 is located at the nearest side of the first movement part 4a to the shelf 10. In a side view of FIG. 1, the recognition device 6 is not shown because it overlaps the first movement part 4a. As the recognition device 6, a camera able to measure three-dimensional position, such as a distance image sensor or an infrared dot pattern projection camera, can be used. The infrared dot pattern projection camera projects an infrared dot pattern onto a target object, and photographs an infrared image of the object G (located in the shelf 10) under this condition. By analyzing the infrared image, three-dimensional information of the object G can be acquired. The infrared dot pattern projection camera may photograph a color image or a monochrome image. Alternatively, except for the infrared dot pattern projection camera, the recognition device 6 may include an optical sensor such as a camera to acquire a color image or a monochrome image. Furthermore, the recognition device 6 may include a plurality of cameras. By locating the plurality of cameras at another position, for example, a shape of the object along a depth direction can be recognized accurately. Furthermore, as shown in FIG. 2, the recognition device 6 may be located at a top of the second movement part 4b. As a result, a situation of the object G in the cargo bed 5 can be recognized. For example, above-mentioned image is image data generally used, such as jpg, gif, png or bmp. Moreover, the recognition device 6 may be located at the holding part 3c. By locating the recognition device 6 at the holding part 3c, a position and a posture of the object G along a depth direction can be accurately recognized.

The cargo bed 5 is a place to transfer the object G held by the holding mechanism 3. The cargo bed 5 is located on the base of the carriage 2. The cargo bed 5 includes a transfer part 5a and a fourth movement part 5b. The transfer part 5a is composed by a container, a box, a basket and a planar stage. The fourth movement part 5b is located on the base 2a of the carriage 2 approximately perpendicularly, and can move the transfer part 5a along (+Z)-direction or (−Z)-direction. As the fourth movement part 5b, for example, a linear motion mechanism of an electric slider onto which a stepping motor is loaded may be used. Furthermore, instead of the electric slider, an electric cylinder may be used. When the arm 3a is driving, the cargo bed 5 moves along (+Z)-direction or (−Z)-direction so as not to contact the arm 3a.

Next, one example of movement operation of the object G by the picking apparatus 1 according to the first embodiment is explained. First, the picking apparatus 1 moves to a position near the shelf 10 so as to face the shelf 10. The recognition device 6 recognizes a position of the shelf 10 and a position of the object G carried in the shelf 10. Next, by selecting a target object to be held and by operating the movement mechanism 4, the holding part 3c is moved to a position nearer to the target object. In this case, the arm 3a is rotated by the rotating shaft 3b so that the holding mechanism 3 contacts the shelf 10. The joint 3d is driven so that a face (to be held) of the target object is in parallel with a face (to locate the suction pad) of the holding part 3c. Here, the face (to be held) of the target object is recognizable by the recognition device 6 among faces of the target object, and has the largest area among the faces holdable by the holding part 3c. After that, by pushing the suction pad to the face to be held, the target object is sucked. By operating the movement mechanism 4, the target object is picked out from the shelf 10 and transferred to the cargo bed 5.

Figure 3:
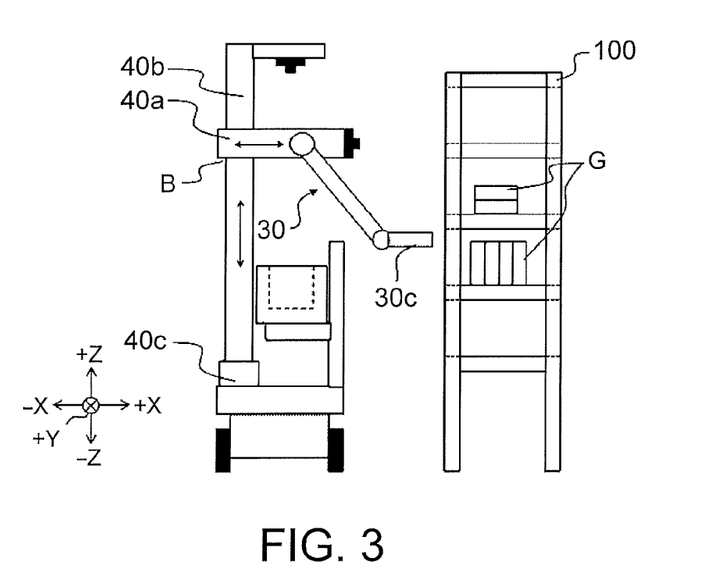
FIG. 3 is a comparison example of the picking apparatus 1 according to the first embodiment.

FIG. 3 is a comparison example of the picking apparatus 1 according to the first embodiment. In component of the comparison example, under the condition that a picking apparatus faces the shelf 100, a second movement part 40b is located at a position away from the shelf 100. On the other hand, a first movement part 40a is connected to the second movement part 40b approximately perpendicularly, and located along a direction toward the shelf 100. A third movement part 40c is located on the base, and connected to the second movement part 40b approximately perpendicularly. Namely, in the same way as the second movement part 40b, the third movement part 40c is located on the base at a position away from the shelf 100.

In the comparison example, in the same way as the picking apparatus 1 of the first embodiment, a holding mechanism 30 is located at the first movement part 40a. Component of the holding mechanism 30 is same as that in the picking apparatus 1 of the first embodiment. The first movement part 40a, the second movement part 40b and the third movement part 40c, are moving along X-axis direction, Z-axis direction and Y-axis direction respectively.

In component of the comparison example, the second movement part 40b is located at a position away from the shelf 100, and a distance between a connection point B (of the second movement part 40b and the first movement part 40a) and a holding part 30c is long. Accordingly, while the first movement part 40a is moving to the side of the shelf 100, a vibration of the holding part 30c is large. As a result, it is hard to hold the object accurately. Furthermore, a large moment occurs at the connection point B, and it is feared that the first movement part 40a and the second movement part 40b are broken.

On the other hand, in the picking apparatus 1 of the first embodiment, under the condition that the picking apparatus 1 faces the shelf 10, the second movement part 4b is located at a position nearer to the shelf 10. Furthermore, the first movement part 4a is connected to the second movement part 4b approximately perpendicularly, and located at a position away from the shelf 10. While the holding mechanism 3 is moving along a direction toward the shelf 10 by operating the first movement part 4a, a moment occurred at a connection part A (in FIG. 2) between the first movement part 4a and the second movement part 4b can be reduced. Furthermore, a distance from the connection part A to the holding part 3c can be shortened, and a vibration occurred at the holding part 3c (being operated) can be reduced. As a result, holding-transportation can be performed quickly and stably.

Furthermore, in the picking apparatus 1 of the first embodiment, by using the linear motion mechanism as the movement mechanism 4, the number of motors can be reduced than a mechanism of multi-joint type, and the cost can be also reduced.

(The Second Embodiment)

Figure 4:
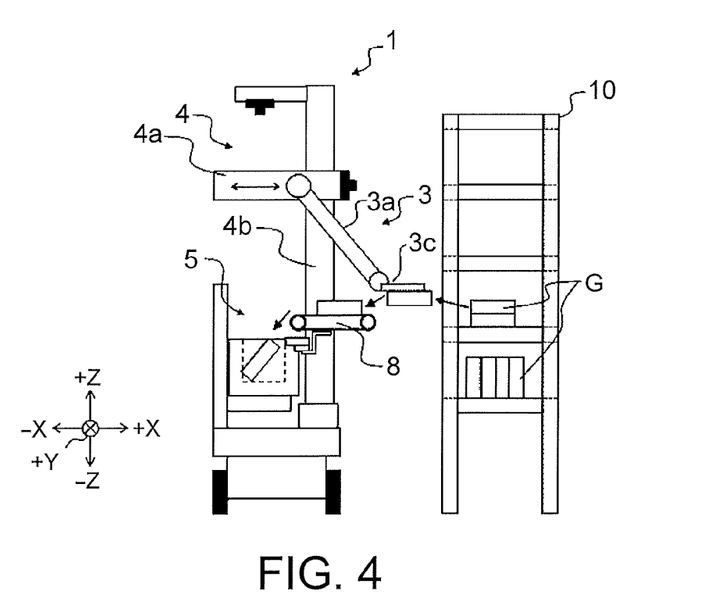
FIG. 4 is a schematic diagram of a picking apparatus facing the shelf according to the second embodiment.

A picking apparatus of the second embodiment is explained by referring to FIG. 4. FIG. 4 is a schematic diagram of the picking apparatus 1 facing the shelf according to the second embodiment.

As shown in FIG. 4, the picking apparatus 1 includes a conveyor 8, which is different from the picking apparatus of the first embodiment. Other components are same as those of the picking apparatus of the first embodiment.

The conveyor 8 is a belt conveyor. A ring-shaped belt having wide width is rotated on a table, and the belt on which the object G is carried is moving. For example, a roller is equipped with one end and the other end of the table respectively, and the belt wound around two rollers are rotated. A material of the belt is a rubber and so on.

The conveyor 8 is located approximately parallel to the first movement part 4a. The object G held by the holding part 3c is transferred to the conveyor 8. By operating the conveyor 8, the object G is moved along (−X)-direction and transported to the cargo bed 5.

Next, positioning of the conveyor 8 is explained in detail. The holding mechanism 3 of the second embodiment is moving in translation with along XYZ-axes directions by the movement mechanism 4. The conveyor 8 is a place where the object G (conveyed by the holding part 3c) is carried. Accordingly, the conveyor 8 is preferably located just under (or adjacent to) the arm 3a and holding part 3c.

Furthermore, the conveyor 8 transfers the object G to the cargo bed 5. Accordingly, the conveyor 8 can move along (+Z)-direction or (−Z)-direction so as to match with a height of the cargo bed 5. Furthermore, the conveyor 8 operates in accordance with an operation of the holding mechanism 3.

Figure 5A:
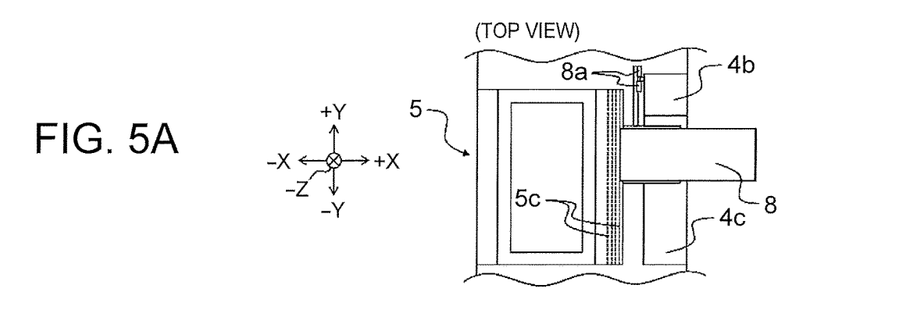
FIGS. 5A and 5B are schematic diagrams of a circumference mechanism of a conveyor 8.
Figure 5B:
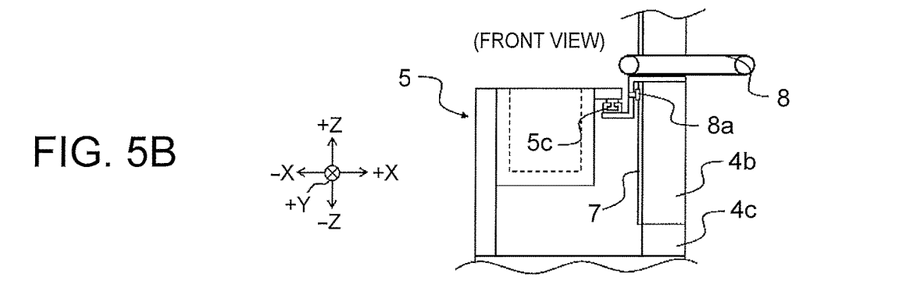

Accordingly, the conveyor 8 can move along (+Y)-direction or (−Y)-direction. The conveyor 8 may move along (+X)-direction or (−X)-direction FIGS. 5A and 5B are schematic diagrams of a circumference mechanism of the conveyor 8. The conveyor 8 is located at the second movement part 4b and moved along (+Y)-direction or (−Y)-direction by the third movement part 4c. Furthermore, the conveyor 8 is moved along (+Z)-direction or (−Z)-direction in proportion to moving of the cargo bed 5. The conveyor 8 is equipped with a linear guide 5c installed into the cargo bed 5, and can be moved along (+Y)-direction or (−Y)-direction. As mentioned-above, this conveyor 8 is preferably located just under the arm 3a and the holding part 3c. Even if the cargo bed 5 is moving along Z-axis direction, by using a rail 7 and a cam follower 8a, Y-axis direction of the conveyor 8 is located at the second movement part 4b.

The second movement part 4b moves the first movement part 4a along Z-axis direction. This movement and the movement of the conveyor 8 along Z-axis direction are performed independently. By this mechanism, the conveyor 8 can be located just under the arm 3a and the holding part 3c, and can follow movement of the cargo bed 5.

In the picking apparatus of the second embodiment, by using the conveyor 8, the holding mechanism 3 need not carry the object G to the cargo bed 5 or the stage. As a result, quick picking can be performed.

Furthermore, a stroke to move the object G held by the holding mechanism 3 is shortened. As a result, fall of the object G from holding part 3c, and risk of interference of the holding mechanism 3 by widely moving the holding part 3c, can be reduced.

(The third embodiment)

Figure 6A:
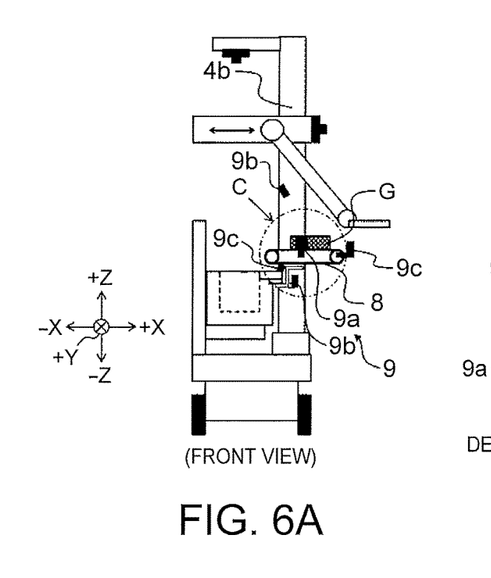
FIGS. 6A and 6B are schematic diagrams of a conveyor part and the circumference component of a picking apparatus according to the third embodiment.
Figure 6B:
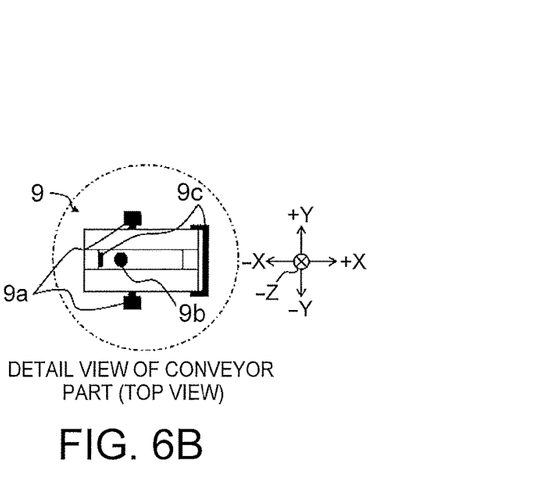

The third embodiment is explained by referring to FIGS. 6A and 6B.

FIGS. 6A and 6B are schematic diagrams of a conveyor part and the circumference component of the picking apparatus according to the third embodiment.

As shown in FIG. 6, at the circumference of the conveyor 8, a second recognition device 9 to recognize object information of the object G (carried on the conveyor 8) is equipped. Other components are same as those of the picking apparatus of the second embodiment.

Regularly, the object G is packaged by a box and so on. On a surface of the package, a barcode representing commodity information is printed. As the commodity information, ITF or QR code (registered trademark), IC tag, a product name, may be used.

The second recognition device 9 reads commodity information from the barcode printed on the object G. The second recognition device 9 may be a barcode reader, a QR code (registered trademark) reader, a camera, a sensor, and so on.

While the object G (carried on the conveyor 8) is moved along a direction toward the cargo bed 5, the commodity information thereof is recognized by the second recognition device 9. As a result, whether to pick the right object is inspected. A velocity to move the belt of the conveyor 8 is adjusted to a velocity recognizable by the second recognition device 9.

Figure 7A:
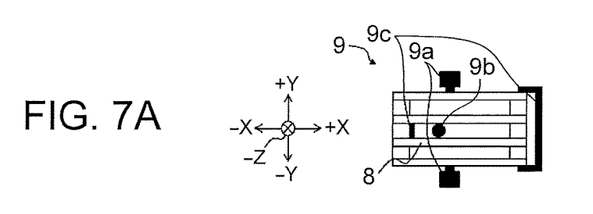
FIGS. 7A and 7B are schematic diagrams of respective locations of second recognition parts.
Figure 7B:
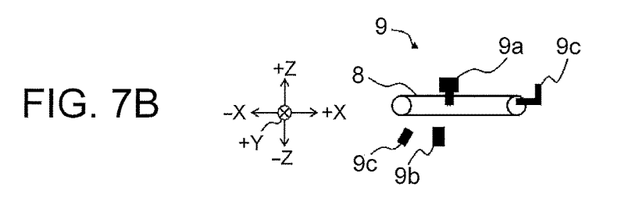

Next, location of the second recognition device 9 is explained in detail. The second recognition device 9 recognizes product information of the object G while the object G is being moved on the conveyor 8. Accordingly, the second recognition device 9 is preferably located adjacent to the conveyor 8. Furthermore, if the object G has a box-shape and if product information (such as barcode) is printed on a surface of the box, it is unknown that the product information is printed on which place of the box. Accordingly, the second recognition device 9 had better recognize all faces of the box. The second recognition device 9 includes second recognition parts 9a, 9b and 9c. The second recognition part 9a recognizes two sides of the object in parallel with a transportation direction to transport the object G on the conveyor 8. The second recognition part 9b recognizes a top and a bottom of the object. The second recognition part 9c recognizes other two sides perpendicular to the transportation direction. Here, the transportation direction is (−X)-direction shown in FIGS. 6A and 6B. For example, the second recognition part 9a includes two cameras, and these two cameras are located so as to put the conveyor 8 between (+Y)-direction and (−Y)-direction perpendicular to the transportation direction. Furthermore, for example, the second recognition part 9b includes two cameras, and these two cameras are located so as to put the conveyor 8 between (+Z)-direction and (−Z)-direction. As to the camera located at the side of (−Z)-direction, an imaging view of the camera is obstructed by the conveyor 8. Accordingly, as shown in FIGS. 7A and 7B, by forming slits onto a belt of the conveyor 8, information of a bottom face of the object is recognized by the camera. Even if the slits are not formed onto the belt, for example, the conveyor may be formed by a transparent resin material, and the belt may be formed by a urethane rubber or a silicon rubber having high transparency. The camera located at the side of (+Z)-direction (top face of the conveyor 8) recognizes a top face of the object. The camera at the side of (+Z)-direction is located at a predetermined space from the conveyor 8 so as not to interfere with the object while the object is being moved on the conveyor 8.

The second recognition part 9c is a camera to recognize side faces of the object perpendicular to the transportation direction. For example, the second recognition part 9c includes two cameras, and these two cameras are located so as to put the conveyor 8 between (+X)-direction and (−X)-direction. The second recognition part 9c is the camera located on the transportation direction of the object. Accordingly, the second recognition part 9c is preferably located so as not to interfere with the object. Furthermore, if the second recognition part 9a or the second recognition part 9b is a wide angle camera able to recognize the side (of the object) perpendicular to the transportation direction, the second recognition part 9c can be replaced with the second recognition part 9a or the second recognition part 9b.

The object information recognized by the second recognition device 9 is stored in a storage device installed into a controller of the carriage, and compared with object information (picking target object) previously stored in the storage device. As a result, the object to be picked is decided whether to be the picking target object. As the storage device, for example, a tape such as a magnetic tape or a cassette tape, a disk including a magnetic disk (such as a floppy (registered trademark) disk/hard disk) and an optical disk (such as CD-ROM/MO/MD/DVD/CD-R), a card such as IC card (including memory card)/optical card, or a semiconductor memory such as mask ROM/EPROM/EEPROM/flash ROM, can be used. Decision whether to be the picking target object is executed by CPU in the controller.

Furthermore, the object information recognized by the second recognition device 9 may be transferred to the outside data server or computer, and decision whether to be the picking target object may be executed thereby. In this case, the controller includes a communication device. For example, the communication device is a part to transmit data (stored in the storage device) to the outside server. As the communication device, a wireless communication device is preferably used. Except for this, the communication device may be composed as a communication network. As the communication network, for example, Internet, Intranet, Extra-net, LAN, ISDN, VAN, CATV communication network, VPN (virtual primitive network), telephone line network, mobile communications network, satellite communications network, can be used. A transmission medium composing the communication network is not limited to specific one. For example, a wire (such as IEEE1394, USB, power line transportation, cable TVline, telephone line, ADCL line), an infrared ray (such as IrDA, remote control), and a wireless (such as Bluetooth (registered trademark), 802.11 Wireless, HDR, cellular phone network, satellite line, ground wave digital network), can be used.

Figure 8:
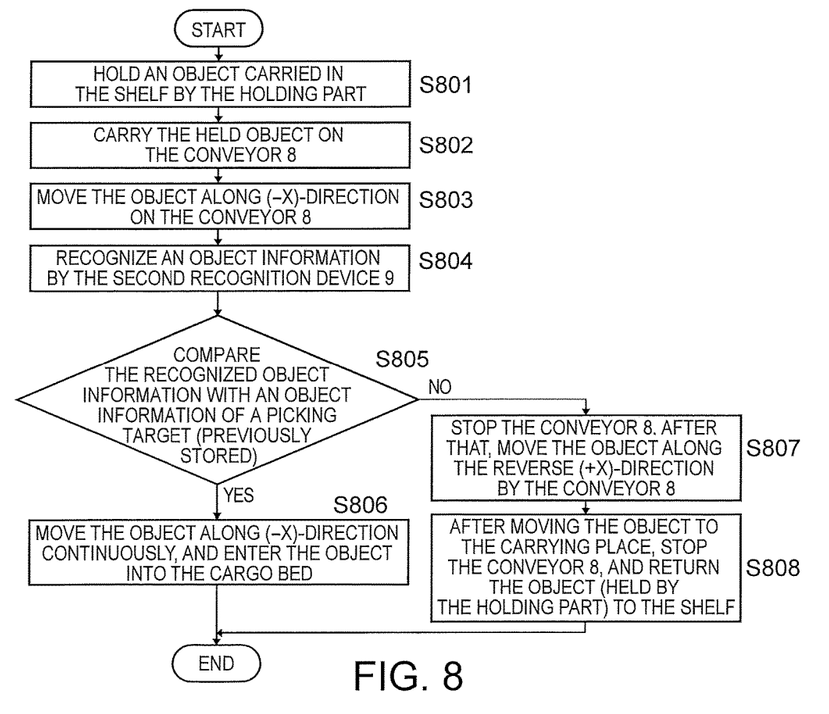
FIG. 8 is a flow chart of inspection by the picking apparatus according to the third embodiment.

Next, inspection operation of the picking apparatus of the third embodiment is explained. FIG. 8 is a flow chart of inspection by the picking apparatus according to the third embodiment. First, by the holding part of the picking apparatus, an object carried in the shelf is held (S801). The object (held by the holding part) is carried on the conveyor 8 (S802). The object is moved along (−X)-direction on the conveyor 8 (S803). By the second recognition device 9, object information thereof is recognized (S804). The object information (recognized by the second recognition device) is compared with object information of picking target (previously stored). In case of "YES", the object is moved (as it is) along (−X)-direction and entered into the cargo bed (S806). In case of "NO", the conveyor 8 is stopped. After that, the conveyor 8 moves the object along the reverse direction ((+X)-direction) (S807). After moving the object to the carrying place, the conveyor 8 is stopped. The object is held by the holding part and returned to the shelf (S808).

As a series of operation of the conveyor 8, the object is recognized by the recognition device 6 and the second recognition device 9. By using this recognition result, the conveyor 8 is controlled by the controller in the carriage 2.

In the picking apparatus of the third embodiment, by equipping the second recognition device 9, whether the held object is a holding target object can be inspected. Furthermore, even if an erroneous object is held, before this object is entered into the cargo bed, the conveyor 8 is stopped and the object is returned to the shelf. As a result, even if objects of different types are stacked in the shelf, only picking target object can be effectively picked. Furthermore, objects except for the picking target object are not entered into the cargo bed. As a result, labor and time to manually correct can be saved, and manpower saving of the distribution center can be planned.

(The fourth embodiment)

Figure 9A:
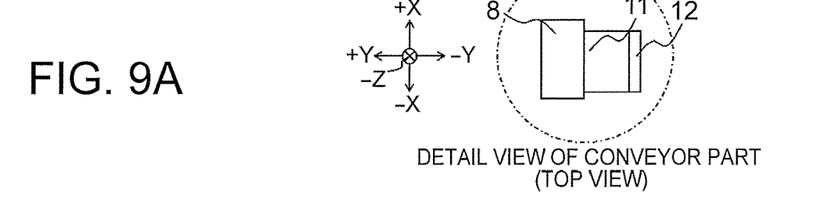
FIGS. 9A and 9B are schematic diagrams of a picking apparatus according to the fourth embodiment.
Figure 9B:
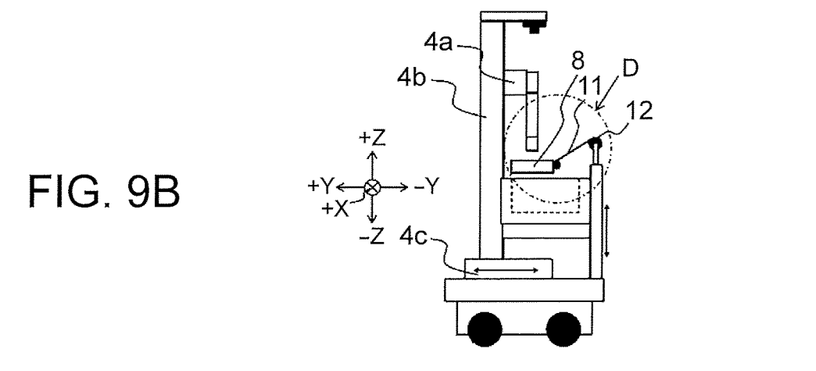

The fourth embodiment is explained by referring to FIGS. 9A and 9B. FIGS. 9A and 9B are schematic diagrams of the picking apparatus according to the fourth embodiment. As shown in FIGS. 9A and 9B, the picking apparatus 1 includes a sheet 11 (for fall-prevention for the object) adjacent to the conveyor 8, and a winding shaft 12 to wind the sheet 11. Other components are same as those of the picking apparatus of another embodiment.

The winding shaft 12 is located at a position (away from the conveyor 8) in parallel with a transportation direction (X-axis direction) of the conveyor 8. Furthermore, the winding shaft 12 is preferably located at a position slightly higher than a height of the conveyor 8. As to the sheet 11, one end thereof is connected to the winding shaft 12, and the other end thereof is connected to the side face of the conveyor 8. The sheet 11 is under a status that a force is always applied to the winding direction of the winding shaft 12. As a result, the sheet 11 has always a tightened condition between the conveyor 8 and the winding shaft 12. Furthermore, a height of the conveyor 8 is lower than a height of the winding shaft 12. Accordingly, the sheet 11 has an inclination toward a side of the conveyor 8 (lower side). As mentioned-above, the other end of the sheet 11 is connected to the side face of the conveyor 8. Except for this, by setting a fixed part (adjacent to the conveyor 8) movable with the conveyor 8, the other end of the sheet 11 may be connected to the fixed part. As the sheet 11, any softy woundable materials such as a polyethylene sheet, a plastic sheet, a rubber sheet, can be used. As the winding shaft 12, any materials able to always generate an elastic force toward the winding direction (e.g., a flat spring, a constant load-conston spring), can be used.

The conveyor 8 can be moved along Y-axis direction perpendicular to the transportation direction. Accordingly, by moving the conveyor 8, an angle of inclination of the sheet 11 is changed. When a distance between the conveyor 8 and the winding shaft 12 is smallest, the angle of inclination of the sheet 11 is largest. On the other hand, the larger the distance between the conveyor 8 and the winding shaft 12 is, the smaller the angle of inclination of the sheet 11 is.

In the picking apparatus of the fourth embodiment, by equipping the sheet 11 and the winding shaft 12 to wind it, even if the object is separated from the holding part by degradation of an absorption power of the holding part, fall of the object can be prevented.

Furthermore, when the object is fallen onto the sheet 11, by moving the conveyor 8 to a direction of the winding shaft 12, the angle of inclination is enlarged, and the object can be slipped down on the conveyor 8. Accordingly, the object erroneously fallen from the holding part can be returned to the conveyor 8 without manpower. As a result, manpower saving of the distribution center can be planed.

(The fifth embodiment)

Figure 10A:
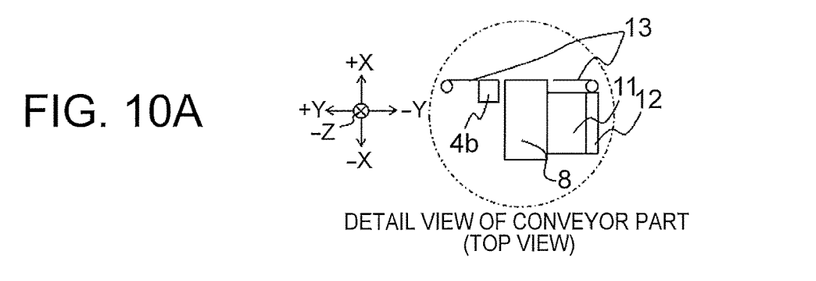
FIGS. 10A and 10B are schematic diagrams of a picking apparatus according to the fifth embodiment.
Figure 10B:
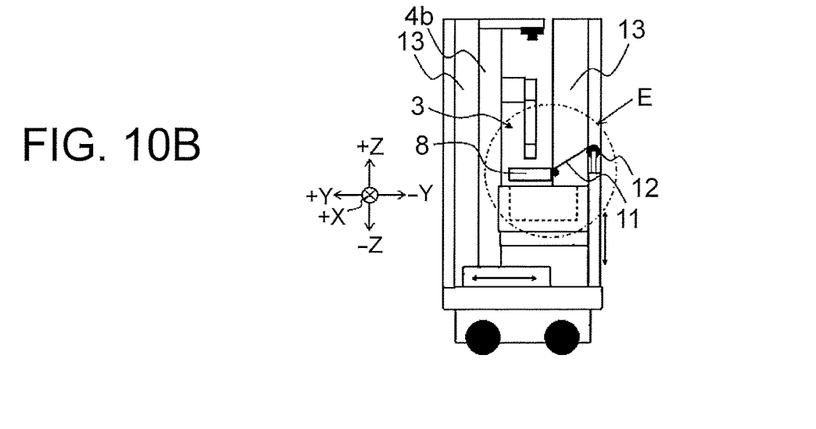

The fifth embodiment is explained by referring to FIGS. 10A and 10B. FIGS. 10A and 10B are schematic diagrams of the picking apparatus according to the fifth embodiment. As shown in FIGS. 10A and 10B, the picking apparatus 1 equips a curtain 13 to cover the movement mechanism 4. Other components are same as those of the picking apparatus of another embodiment.

The curtain 13 preferably covers all faces of the picking apparatus except for a space along (−X)-direction where the holding mechanism 3 is operating. As the curtain 13, any materials such as a polyethylene sheet, a plastic sheet, a rubber sheet, can be used.

In the picking apparatus of the fifth embodiment, by equipping the curtain 13, for example, when the object naturally falls from the shelf, risk that the object is accidentally entered into the movement mechanism of the picking apparatus can be reduced.

As to the picking apparatus according to the first, second, third, fourth and fifth embodiments, under the condition that the picking apparatus faces the shelf, operation of the holding mechanism 3 and the movement mechanism 4 was explained. However, operation thereof is not limited to above explanation. The holding mechanism 3 and the movement mechanism 4 can access the side face of the shelf from the oblique direction, and pick the object therefrom.

(The sixth embodiment)

Figure 11:
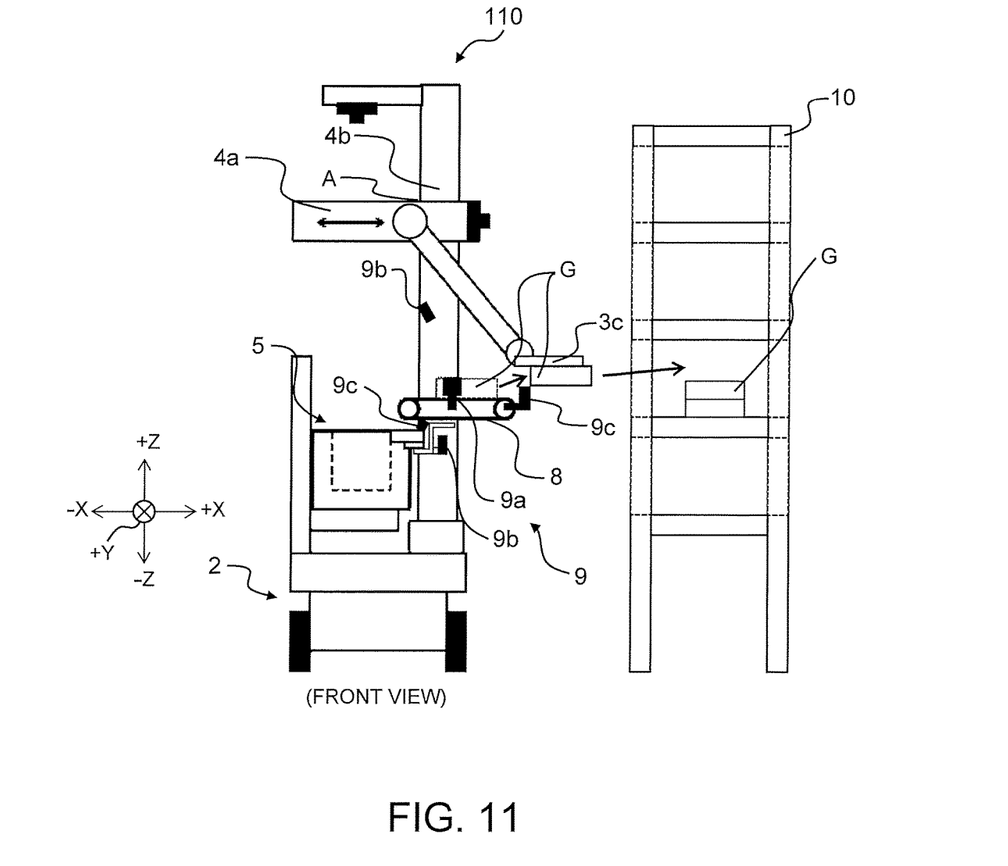
FIG. 11 is a schematic diagram of a pick-out apparatus according to the sixth embodiment.
Figure 12:
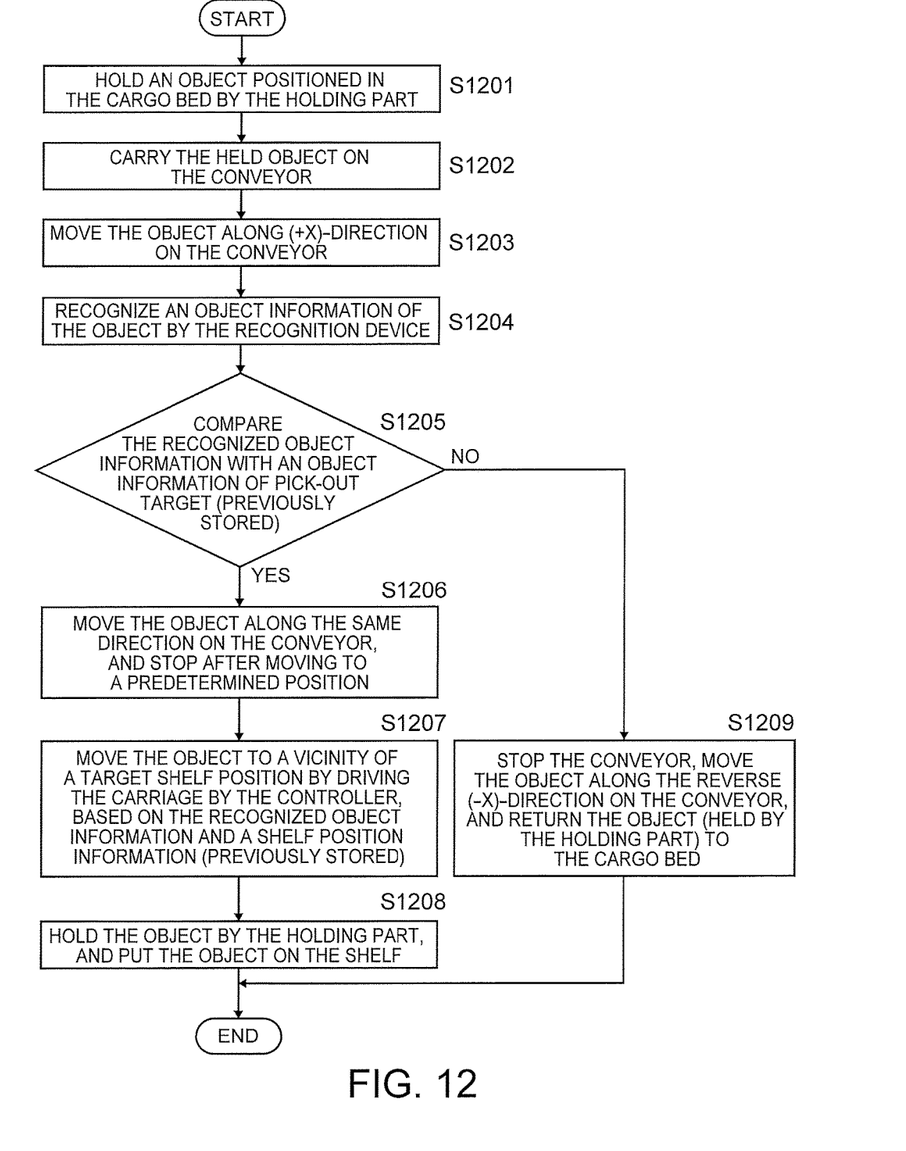
FIG. 12 is a flow chart of operation of the pick-out apparatus according to the sixth embodiment.

The sixth embodiment is explained by referring to FIGS. 11 and 12. FIG. 11 is a schematic diagram of a pick-out apparatus 110 (for putting the object on the shelf) according to the sixth embodiment.

As shown in FIG. 11, the pick-out apparatus 110 has almost same component as the picking apparatus 1 (the third embodiment) shown in FIG. 6. In the pick-out apparatus 110 of the sixth embodiment, an object G positioned in the cargo bed 5 is held by the holding part 3c, and carried on the conveyor 8. Then, while the object G is being moved on the conveyor 8, the recognition device 9 recognizes the object information. After that, based on the object information, the pick-out apparatus 110 moves the object G to a vicinity of the shelf 10 to pick out the object G, and the object G is carried onto the shelf 10 by the holding part 3c.

Recognition of the object information is performed by recognizing bar-code information printed on a package of the object G by the recognition device 9. As shown in FIG. 11, if the object G is packaged as a cuboid, the recognition device 9 is preferably located so as to recognize all six faces of the object G. The reason is that, a part on which the bar-code information is printed is different due to the object G.

Furthermore, if an IC tag is attached to the object G, the IC tag is preferably recognized by the recognition device 9. The shelf 10 to put the object G is selected based on the shelf position information stored in the storage in the controller of the pick-out apparatus 110. For example, if the shelf position information stored in the controller is classified into respective categories such as type of the object, based on the object information recognized by the recognition device 9, the shelf position corresponding to a category of the object is selected.

In order to decide which object is put on the shelf, the controller compares the object information (recognized by the recognition device 9) with an object information of a pick-out target (previously stored in the storage of the controller). As a result, the controller decides whether the object on the conveyor 8 is the pick-out target. The object information of the pick-out target stored in the storage is wirelessly connected to the external server or the computer, and arbitrarily rewritable. Furthermore, for example, the worker may directly rewrite the object information by inserting a USB memory or an IC card (including a memory card) storing the object information into a reader installed on the carriage.

Next, operation of the pick-out apparatus 110 of the sixth embodiment is explained. FIG. 12 is a flow chart of one example of operation of the pick-out apparatus 110 of the sixth embodiment.

First, in the pick-out apparatus 110, the object G positioned in the cargo bed G is held by the holding part (S1201). The object G (held by the holding part) is carried on the conveyor 8 (S1202). The conveyor 8 drives a belt thereof along (+X)-direction, and moves the object G along (+X)-direction on the belt (S1203). While the object G is being moved along (+X)-direction, the recognition device 9 recognizes the object information of the object G (S1204). The controller compares the recognized object information with the previously-stored object information of the pick-out target (S1205). If the recognized object information is matched with the previously-stored object information (Yes at S1205), the object G is moved along (+X)-direction on the conveyor 8 continuously, and stops after moving to a predetermined position (S1206). Based on the object information (recognized by the recognition device 9) and the shelf position information (previously stored), the controller moves the object G to a vicinity of the target shelf position by driving the carriage 2 (S1207). The object G is held by the holding part 3c and put onto the shelf (S1208). After that, this operation is completed. If the recognized object information is not matched with the previously-stored object information of the pick-out target (No at S1205), the conveyor 8 is stopped. Then, the belt of the conveyor 8 moves along the reverse (−X)-direction, and the object G is returned to the cargo bed 5 by the holding part (S1209). After that, this operation is completed.

If a plurality of objects exists in the cargo bed 5, by repeating above-mentioned processing flow, the objects contained in the cargo bed 5 are put onto the target shelf. In the cargo bed 5 of the pick-out apparatus, objects of the same type are preferably contained. On the shelf, objects of the same type are often carried. Accordingly, a movement amount of the pick-out apparatus can be reduced.

Component of the shelf is not limited to the component shown in FIG. 11. For example, a shelf for flat-placing or a shelf for showcase may be applied.

In above-mentioned explanation, while the object G is being moved on the conveyor 8, the object information is recognized by the recognition device 9. However, the recognition method is not limited to this. For example, by locating the recognition device at the holding part 3c and an upper edge of the cargo bed 5, the object information may be recognized when the object is picked out from the cargo bed 5. In this case, the object G need not be carried on the conveyor 8. Accordingly, operation of the pick-out apparatus can be simplified.

In above-mentioned explanation, the pick-out apparatus is limitedly applied. However, component of the apparatus of the sixth embodiment is not limited to the pick-out apparatus. An apparatus for putting the object on the shelf, such as a loading device or a product display device, can be widely applied.

In the pick-out apparatus 110 of the sixth embodiment, under the condition that the pick-out apparatus 110 faces the shelf 10, the second movement part 4b is located at a position nearer to the shelf 10. Furthermore, the first movement part 4a is connected to the second movement part 4b approximately perpendicularly, and located at a position away from the shelf 10. As a result, while the holding mechanism 3 is moving along a direction toward the shelf 10 by operating the first movement part 4a, a moment occurred at a connection part A (in FIG. 1l) between the first movement part 4a and the second movement part 4b can be reduced. Furthermore, a distance from the connection part A to the holding part 3c can be shortened, and a vibration occurred at the holding part 3c (being operated) can be reduced. As a result, pick-out of the object can be performed quickly and stably.

By applying the pick-out apparatus of the sixth embodiment to the picking apparatus of the first, second, third, fourth and fifth embodiments, both the object picking and the object pick-out (such as exhibiting or loading) can be performed by a single apparatus.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A picking apparatus comprising:
a carriage;

a holding mechanism having
   an arm,
   a rotating shaft provided at one end of the arm to rotate the arm, and
   a holding part provided at the other end of the arm to be able to hold at least one object; and
a movement mechanism provided on the carriage, having
   a first movement part that moves the rotating shaft along a first direction toward the object, and
   a second movement part that moves the first movement part along a second direction intersecting with the first direction and approximately perpendicular to the carriage;
wherein the first movement part is positioned along a direction away from the object with respect to the second movement part.

2. The picking apparatus according to claim 1, wherein the movement mechanism further has a third movement part that moves the second movement part along a third direction intersecting with the first direction and the second direction.

3. The picking apparatus according to claim 1, further comprising:
   a joint between the holding part and the arm.

4. The picking apparatus according to claim 1, further comprising:
   a cargo bed provided on the carriage and movable along the second direction.

5. The picking apparatus according to claim 1, further comprising:
   a support part to carry the object held by the holding part.

6. The picking apparatus according to claim 5, wherein the support part includes a belt conveyor.

7. The picking apparatus according to claim 5, wherein the support part is movable along at least one of the second direction and the third direction.

8. The picking apparatus according to claim 1, wherein the holding part includes a suction pad.

9. The picking apparatus according to claim 1, wherein the movement mechanism includes a first recognition device that recognizes the object.

10. The picking apparatus according to claim 1, wherein the holding part includes a second recognition device that recognizes the object.

11. The picking apparatus according to claim 5, wherein the support part includes a third recognition device that recognizes an object information of the object.

12. The picking apparatus according to claim 1, wherein the first movement part is located in parallel with the first direction and slides along the first direction, and the second movement part is located in parallel with the second direction and slides along the second direction.

13. The picking apparatus according to claim 12, wherein a connection part between the first movement part and the second movement part is positioned nearer to the object with respect to the first movement part.

14. The picking apparatus according to claim 11, wherein the third recognition device includes
   a first recognition part that recognizes a side face of the object transported by the support part, the side face being in parallel with a transportation direction of the object,
   a second recognition part that recognizes a top face and a bottom face of the object transported by the support part, and
   a third recognition part that recognizes another side face of the object transported by the support part, the another side face being approximately perpendicular to the transportation direction.

15. The picking apparatus according to claim 14, wherein the third recognition device generates the object information of the object, based on respective recognition results of the first recognition part, the second recognition part and the third recognition part.

16. The picking apparatus according to claim 11, further comprising:
   a controller that stores a target object information of a target object to be picked, and compares the object information with the target object information.

17. The picking apparatus according to claim 16, wherein, if the object information is matched with the target object information,
   the controller controls the support part to move the object along the transportation direction continually.

18. The picking apparatus according to claim 16, wherein, if the object information is not matched with the target object information,
   the controller controls the support part to stop movement of the object along the transportation direction, and to move the object along a reverse direction of the transportation direction.

19. The picking apparatus according to claim 18, wherein, when the object is moved to a place where the object is carried by the support part,
   the controller controls the support part to stop movement of the object along the reverse direction, and controls the holding part to hold and return the object.

20. A picking apparatus comprising:
   a carriage;
   a holding mechanism having
      an arm,
      a rotating shaft provided at one end of the arm to rotate the arm, and
      a holding part provided at the other end of the arm to be able to hold at least one object; and
   a movement mechanism provided on the carriage, having
      a first movement part that moves the rotating shaft along a first direction toward the object,
      a second movement part that moves the first movement part along a second direction intersecting with the first direction and approximately perpendicular to the carriage,
      the first movement part being positioned along a direction away from the object with respect to the second movement part, and
      a first recognition device that recognizes a position of the object; and
   a controller that moves the first movement part and the second movement part to make the holding part be nearer to the object, based on the position of the object.

* * * * *